March 5, 1940. E. J. STAHL 2,192,207
UTILITY TRUCK
Filed Oct. 13, 1937 8 Sheets-Sheet 1
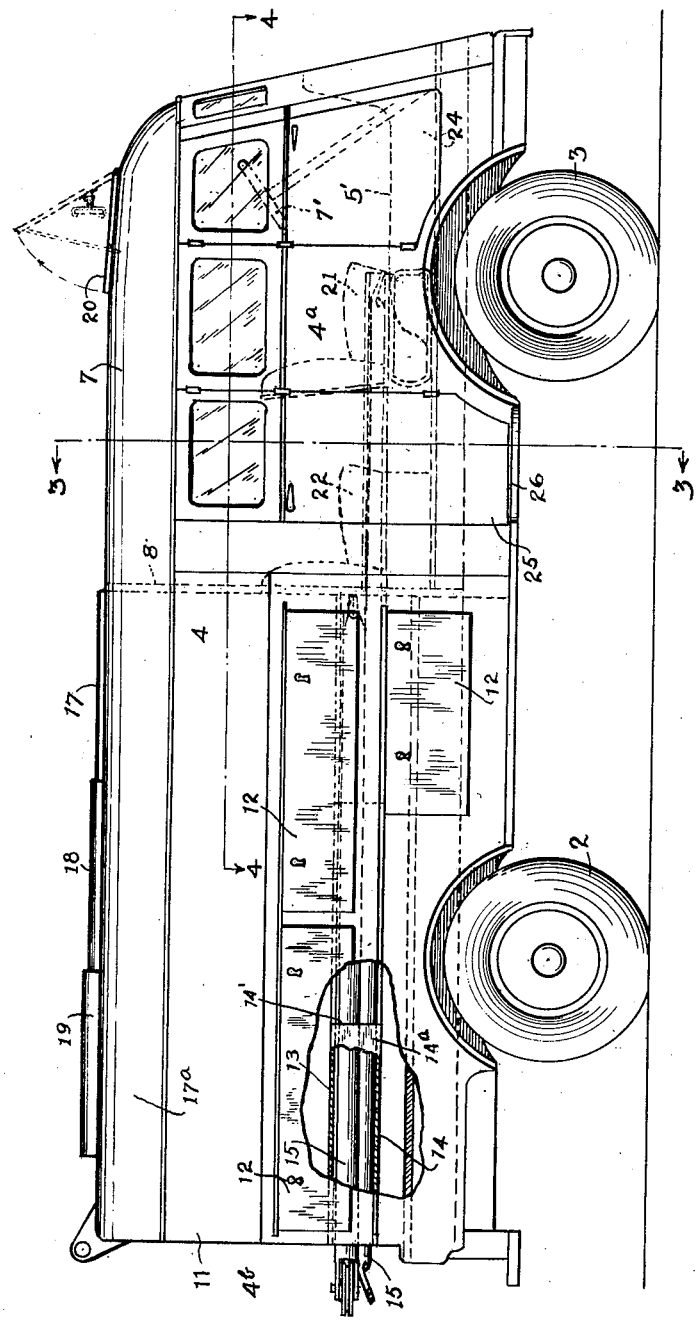
INVENTOR
Edward J. Stahl
BY Geo. B. Pitts
ATTORNEY March 5, 1940. E. J. STAHL 2,192,207
UTILITY TRUCK
Filed Oct. 13, 1937 8 Sheets-Sheet 2
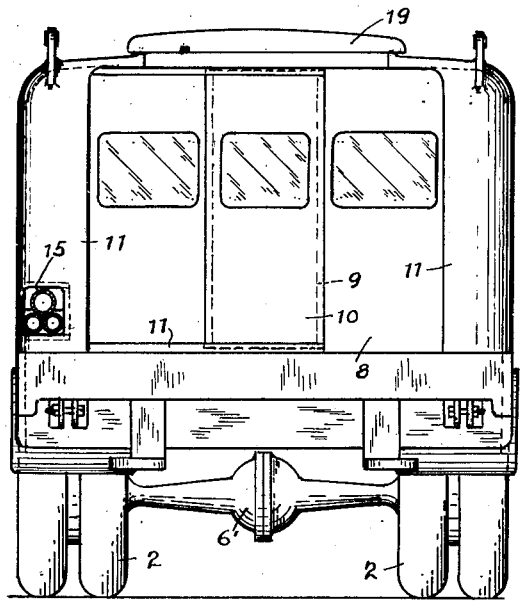
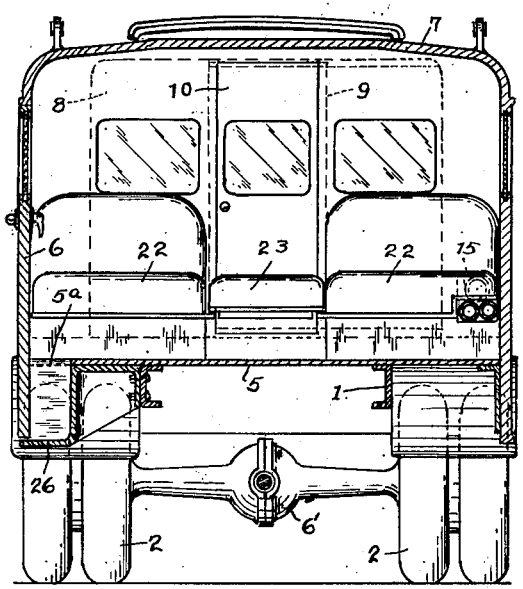
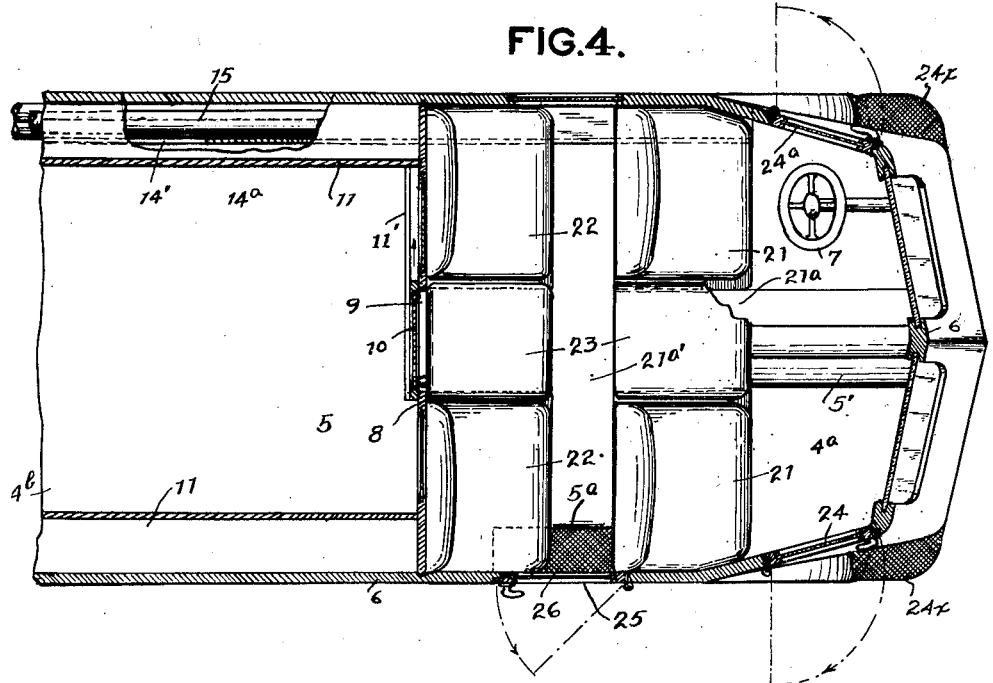
INVENTOR
Edward J. Stahl
BY Geo. B. Pitts
ATTORNEY March 5, 1940.  E. J. STAHL  2,192,207

UTILITY TRUCK

Filed Oct. 13, 1937   8 Sheets-Sheet 3

INVENTOR.
Edward J. Stahl
BY Geo. B. Pitts
ATTORNEY.

March 5, 1940.   E. J. STAHL   2,192,207
UTILITY TRUCK
Filed Oct. 13, 1937    8 Sheets-Sheet 4

INVENTOR.
BY Edward J. Stahl
Geo. B. Pitts
ATTORNEY

March 5, 1940.  E. J. STAHL  2,192,207

UTILITY TRUCK

Filed Oct. 13, 1937  8 Sheets-Sheet 6

INVENTOR.
Edward J. Stahl
Geo. B. Pitts
BY
ATTORNEY.

March 5, 1940. E. J. STAHL 2,192,207
UTILITY TRUCK
Filed Oct. 13, 1937   8 Sheets-Sheet 8

INVENTOR.
Edward J. Stahl
BY Geo. B. Pitts
ATTORNEY.

Patented Mar. 5, 1940

2,192,207

UNITED STATES PATENT OFFICE 2,192,207

UTILITY TRUCK

Edward J. Stahl, Lakewood, Ohio, assignor to The Baker-Raulang Company, Cleveland, Ohio, a corporation of Ohio Application October 13, 1937, Serial No. 168,764

8 Claims. (Cl. 296—64)

This invention relates to a vehicle of the utility type for line construction and maintenance, more particularly a vehicle having a body comprising a crew carrying compartment at its forward end for the crew during transportation and an operating or storage compartment at its rear end. In vehicles adapted for line construction and kindred or allied operations, several conditions must be adequately met to insure practical results, namely, maximum safety for the men in either compartment of the body, seating capacity for the entire man crew and protection from all weather conditions during transportation, ease of egress and ingress to the various seats and accessibility for the men to pass from either compartment to the other.

My invention aims to provide an improved body having adequate seating accommodations for the entire operating crew and protection from weather conditions, this being advantageous since the vehicle with its crew and equipment is often called upon to travel a considerable distance to and from their day's assignment. The invention also has for its object a body having improved door and seating arrangements, wherein the seats are disposed in relation to the doors for the crew carrying compartment and a door between the latter compartment and the operating or storage compartment to facilitate ingress and egress to the crew carrying compartment and access from one compartment to the other, these arrangements being advantageous where a large number of men make up the vehicle crew, as well as to provide exits at different points in case of emergency.

Another object of the invention is to provide an improved truck construction of this type capable of seating a full complement of operatives and providing adequate storage space with a minimum wheel base, which facilitates maneuvering of the truck into various working positions for effecting operations which would otherwise be inaccessible or require extra labor and time.

Another object of the invention is to construct an improved truck of this type wherein provision is made to permit the driver or other operative, while within the crew carrying compartment to watch operations such as setting poles, replacing insulators, repairing and replacing cross arms, etc., being carried on rearward of the truck or to visualize conditions at its rear in order to maneuver the truck, without getting out of the crew carrying compartment.

Other objects of the invention will be apparent to those skilled in the art to which my invention relates from the following description taken in connection with the accompanying drawing, wherein Fig. 1 is a side view of a truck (parts being broken away), embodying my invention.

Fig. 2 is an end elevation.

Fig. 3 is a section on the line 3—3 of Fig. 1.

Fig. 4 is a fragmentary section on the line 4—4 of Fig. 1.

Figure 5:
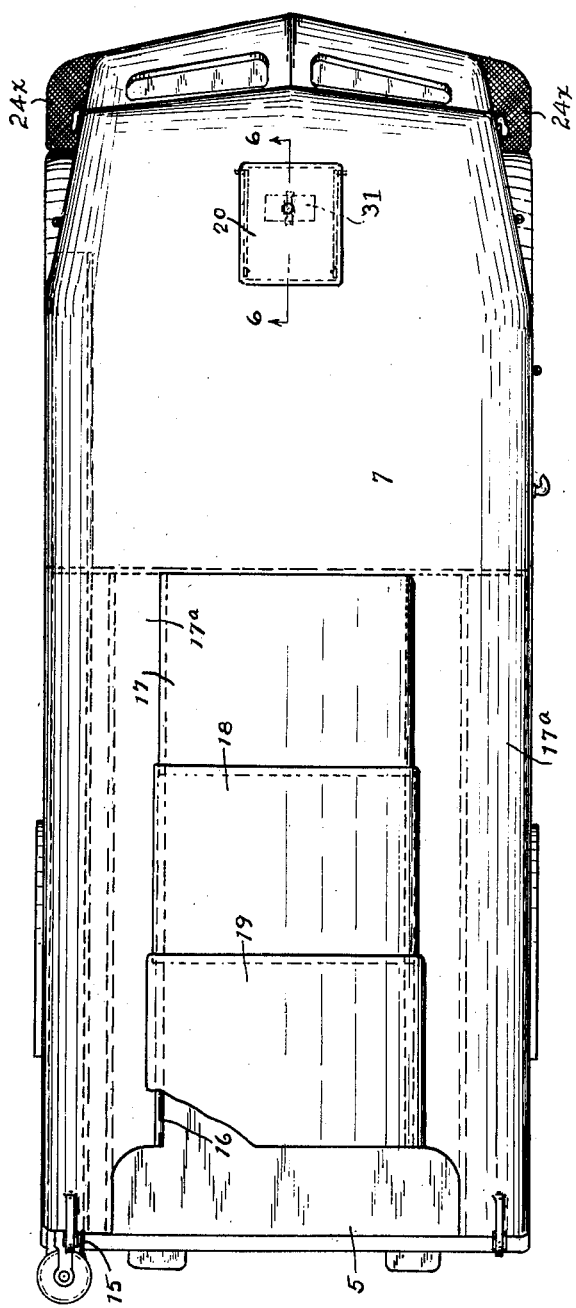
Fig. 5 is a plan view, parts being broken away.
Figure 6:
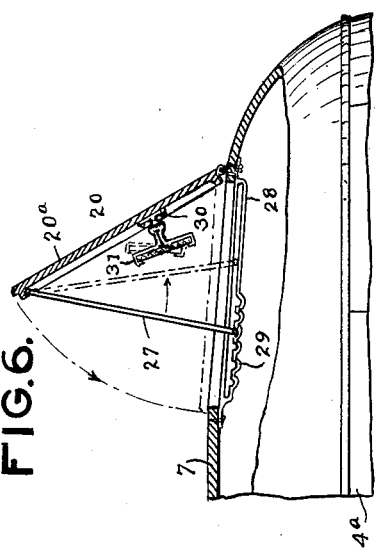
Fig. 6 is a fragmentary section on the line 6—6 of Fig. 5.

In the drawings, referring particularly to Figs. 1 to 6, inclusive, 1 indicates a chassis frame, mounted on rear wheels 2 and front wheels 3, and supporting a body, indicated as an entirety at 4, the front portion of which projects over the engine and its accessories, (not shown) housed by a casing 5'. The wheels 2 are driven through a suitable axle mechanism, in a housing 6', in a well known manner, the driving connections for the mechanism not being shown since the same form no part of the present invention. The front wheels 3 are steerable by means of a wheel 7' mounted within the body 4, the connections between the steering wheel 7' and the wheels 3 not being shown as they form no part of the present invention; and for the same reason the control levers and pedals for the engine and vehicles brakes are omitted.

The body 4 comprises a flooring 5, side and front walls 6 and a roof 7. The body 4 extends from end to end of the chassis frame 1 and is divided intermediate its ends by a transverse partition 8 to form a crew carrying compartment 4a and an operating or storage compartment 4b. The walls of these compartments and partition are shown diagrammatically as they may be variously constructed, but by preference they are fabricated of metal framing sheathed with sheet metal and suitably connected to the roof 7 (which is also formed of sheet metal) to provide the body.

The partition 8 is formed with an opening 9, which is related to the arrangement of the seats in the crew carrying compartment 4a, so that the operatives may readily pass from either compartment to the other when the vehicle is traveling as well as when it is parked. This opening facilitates access to tools, parts and equipment which are in the forward portion of the operating or storage compartment 4b but because materials and other equipment are in the rear portion thereof, cannot be reached from and through its open end.

The opening 9 is provided with a door 10, which is preferably mounted to slide in guides 11' mounted at the upper and lower ends of the partition 8 at one side of the opening 9. It will be understood that the partition may be constructed with spaced walls so that the door may slide into the space therebetween; also that the partition at both sides of the door opening may be constructed with guides so that the door may be operated to open position in either direction.

The operating or storage compartment of the body is constructed to provide along the opposite sides of the flooring 5, side members 11 in which are incorporated storing spaces opening within the compartment 4b and storing spaces having doors 12, permitting access thereto exteriorly of the compartment 4b. The side members 11 may be constructed substantially as shown in the co-pending application of Paul E. Hawkins, filed January 19, 1935, Serial No. 2,554, Letters Patent No. 2,159,022, dated May 23, 1939, to which reference may be made.

The side member 11 and crew carrying compartment 4a on the left side of the body are provided interiorly with upper and lower walls 13, 14, and a side wall 14a which, with the adjacent outer side walls of this member and compartment, form a chamber for the derrick poles 15, the chamber being open at the rear end of the side member 11. The partition 8 is formed with an opening (see Fig. 2) to provide for this chamber. The upper wall 13 for the derrick pole chamber within the crew carrying compartment 4a may be disposed in a plane below that portion of the upper wall within the adjacent side member 11 when necessary to accommodate the seats (see Fig. 3); but it will be obvious that this arrangement may be eliminated to provide a chamber of uniform height from end to end by making the seats higher. The inner side wall 14a of the derrick pole chamber may be formed with one or more openings 14' to permit access to short pipes or other parts that are placed in the chamber and get positioned so that they cannot be reached at the rear of the operating or storage compartment.

The roof 7 rearward of the partition 8 is provided with an elongated opening 16 arranged to be closed by a plurality of rigid sheet metal sections 17, 18, 19, the section 17 being preferably fixed to the side portions 17a of the roof and the sections 18, 19, being slidable relative to each other and the section 17, whereby they may be positioned over the section 17 to uncover the opening 16, so that the derrick poles 15 may be erected and hoisting operations carried out by means of a suitable winch and cable (not shown) as is customary in trucks of this utility type. Suitable guides are provided between the roof sections 18 and 19 and roof side portions 17a, preferably substantially similar to the construction shown in the co-pending application of Paul E. Hawkins, filed October 19, 1935, Serial No. 45,761, Letters Patent No. 2,112,652, dated March 29, 1938, to which reference may be made. Near the forward end of the roof I provide a man-hatch 20 to which reference will later be made.

In the form of construction referred to I provide within the compartment 4a spaced front and rear seats 21, 22 adjacent each side wall of the compartment, each seat at one side being spaced from the corresponding seat at the opposite side of the compartment 4a so that a longitudinally extending aisle 21a in alinement with the opening 9 and an aisle 21a' transversely of the compartment 4a between the front and rear seats are provided. The rear seats 22 are preferably arranged with their backs against the partition 8, whereas the front seats 21 may be mounted for adjustment forwardly and rearwardly. Along their inner side edges the bases of the front and rear seats are provided with ledges to removably support auxiliary seats 23.

24 indicates a hinged door for the crew carrying compartment 4a on the right side thereof alined with the floor space in front of the seats 21. 25 indicates a hinged door rearward of the door 24 and alined with the aisle 21a'. The flooring 5 is cut away at 5a and a step 26 supported by the chassis frame is provided below the cut away 5a. The crew carrying compartment 4a may be provided with a hinged door 24a on the left side thereof forward of the adjacent front seat 21.

The man-hatch 20 is arranged mid-way between the sides of the roof and approximately over the forward portions of the front seats 21, so that the operatives can utilize the latter when necessary to make exit through the hatch, where conditions resulting from an emergency make it impossible for the operatives to leave the body at its rear open end or through any of the doors. The cover 20a for the hatch is hinged along its forward edge and may be held opened for ventilation purposes by means of a rod 27, preferably two rods each pivoted at one end to the outer end of the cover 20a. The opposite ends of the rods have angled portions (see Fig. 5) slidable in the alined slots of plates 28 supported on the inner side of the roof 7 in relation to the side walls of the hatch opening. The angled portions of the rods 27 are arranged to engage spaced notches 29 provided along the rearward portions of the slots to support the cover in any desired adjusted position. On the inner side of the hatch cover 20a I provide a bracket 30 on which is pivoted a mirror 31, held in any desired position by friction or a winged nut 32. The pivotal mounting for the mirror 31 consists of the ball-and-socket type to permit the adjustment of the mirror at different angles. Accordingly, when the hatch cover is opened, the mirror 31 may be adjusted into any desired position which reflects rays from points rearward and laterally of the truck to an operative within the crew carrying compartment 4a. It will thus be seen that the mirror permits the operative to watch an operation at the rear or sides of the truck or to visualize obstructions at its rear and sides in maneuvering the truck into a parking position.

As shown in Figs. 1, 3, 4, and 5, the side and front walls of the crew carrying compartment 4a and doors therefor are provided with suitable glass windows, each of which may be moved to an open position. Also, the partition 8 and door 10 are formed with glass windows so that the driver and other operatives can look therethrough when in either compartment.

As will be understood, the partition 8 and door 10 provide for closing the crew carrying compartment to protect the operatives when therein.

Figure 7:
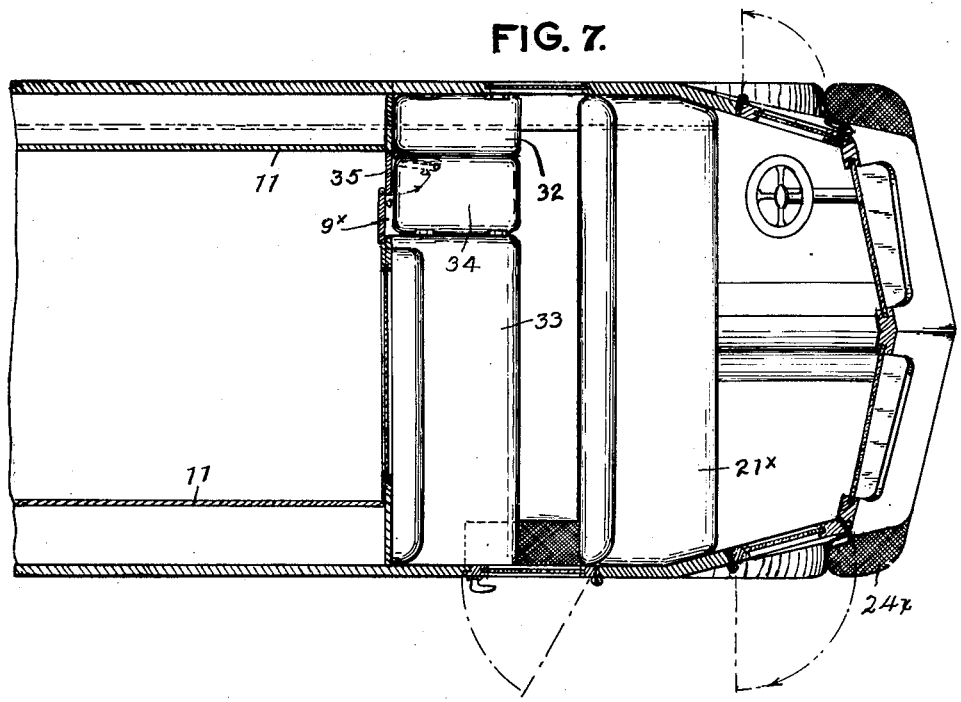
Figs. 7, 8 and 9 are fragmentary sections similar to Fig. 4, but illustrating modifications.

Fig. 7 shows a modified arrangement wherein the opening 9x in the partition 8 is arranged adjacent one side member 11 of the operating or storage compartment 4b. By preference, the front seat 21x extends transversely from side wall to side wall of the crew carrying compartment 4a. 32a indicates a seat rearwardly of the seat 21x and extending longitudinally between it and the partition 8 and preferably hinged along its inner edge to the side wall of the crew carrying compartment and adapted to swing upwardly into an inoperative position and detachably held therein by a suitable latch means. 33 indicates a transversely extending seat extending from the right side wall of the compartment 4a toward its left side wall and spaced from the front seat 21x. The width of the seat 32a is substantially equal to the width of the adjacent side member 11 and the outer end of the seat 33 terminates in spaced relation to the front side of the seat 32a when the latter is in operative position, to form an aisle alined with the door opening 9x. 34 indicates an auxiliary seat, preferably hinged on the outer end of the seat 33 and adapted to be removably supported horizontally in any desired manner when more seating capacity is needed; when the seats 32a, 34 are in operative position, as shown, the seating area extends entirely across the compartment. The seat 34 is preferably folded down into a substantially vertical position to permit access to the opening 9x. The door 35 for the opening 9x is shown as consisting of two hinged-together panels the inner one of which is hinged to the side member 11. The construction of the door and the guide means (not shown) for the outer panel may be substantially similar to that shown in my Letters Patent No. 2,011,596, dated August 20, 1935, for which reason the door construction, its mounting and the guide means for the outer panel are not illustrated.

Figure 8:
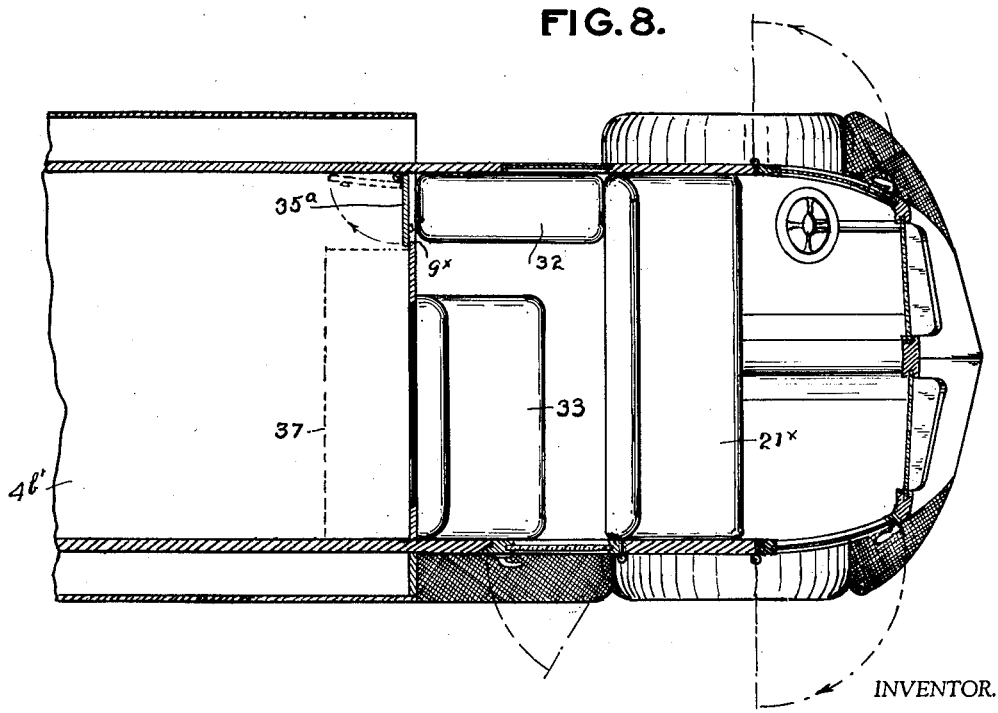

Fig. 8 shows another modified arrangement wherein the crew carrying compartment 4a' is of less width than the operating or storage compartment 4b'. In this arrangement the hinged, longitudinally extending seat 32' is in line with the door opening 9x and is adapted to be swung upwardly to permit passage therethrough from one body compartment to the other; the seat preferably being of a length to occupy the space between the partition and back for the front seat 21x. The door 35a preferably swings into the storage compartment. The doors in the side walls for the crew carrying compartment in each arrangement shown in Figs. 7 and 8 are preferably disposed similarly to the arrangement shown in Fig. 4. The winch for the truck may be positioned in the panel or space indicated by the dotted line 37.

Figure 9:
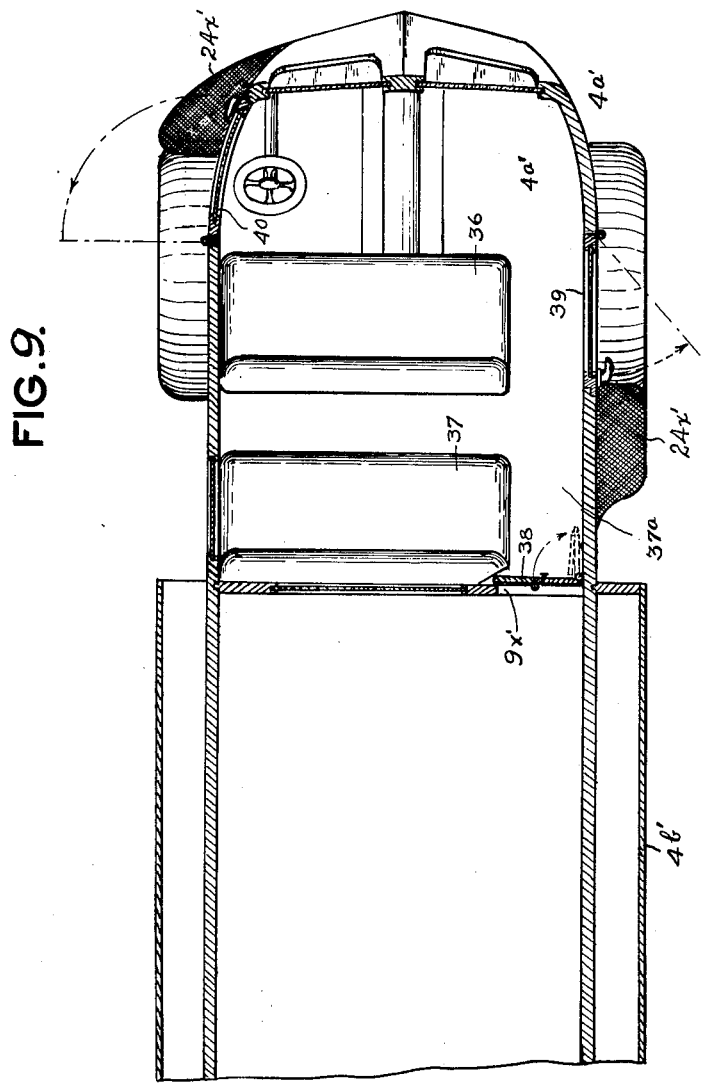

Fig. 9 illustrates another modified form of construction having a single, elongated front seat 36 and a single elongated rear seat 37, both arranged adjacent the left side wall of the crew carrying compartment 4a' and terminating in spaced relation to the right side wall thereof to form a longitudinal aisle 37a merging with the floor spaces in front of both seats and alined with the door opening 9x' which is disposed at the right side of the compartment 4a'. The door 38 for the opening 9x' may be of the foldable type as already referred to in connection with Fig. 7.

In this form of construction, the right side wall of the compartment 4a' is provided with single door 39, preferably approximately alined with the front seat 36 and permits access to the aisle 37a as well as both seats. By preference, a door 40 is provided on the left side of the compartment 4a' forwardly of the seat 36.

Figure 10:
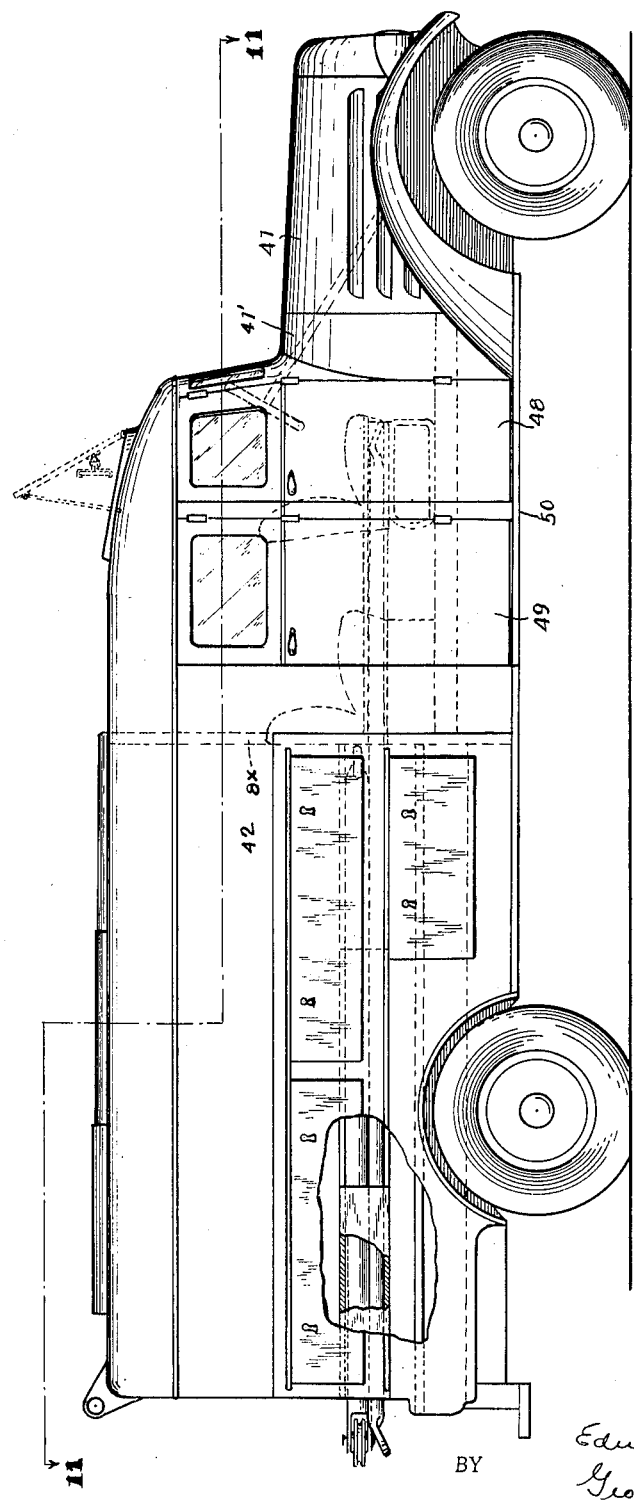
Fig. 10 is a side elevation of a vehicle (parts being broken away) showing a different form of construction.
Figure 11:
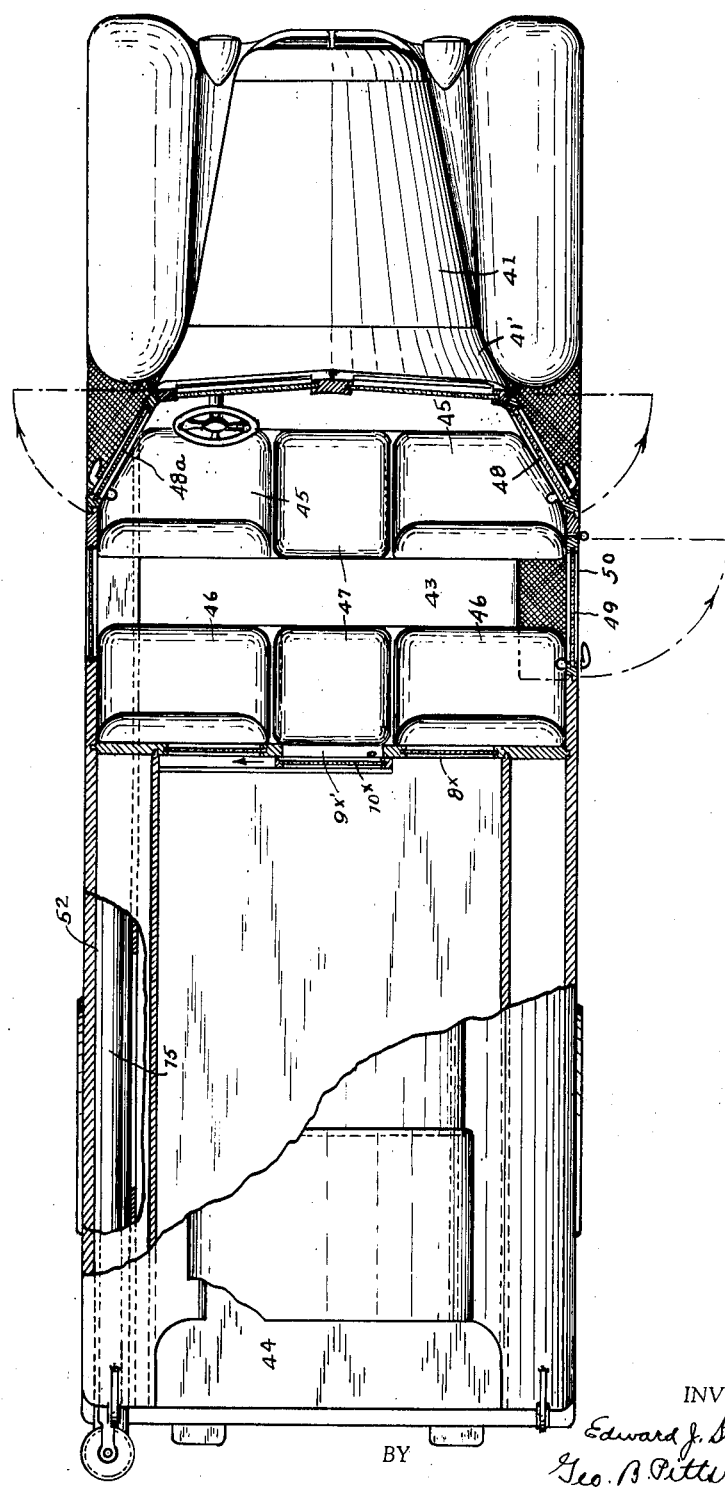
Fig. 11 is a view partly in plan and partly in section on the line 11—11 of Fig. 10.

Figs. 10 and 11 show a body embodying my invention mounted on a chassis wherein the engine is provided with a hood 41 and the body, indicated as an entirety at 42, extends from the hood 41 or cowl 41' rearwardly. In this embodiment of the invention, the body 42, the walls of which are constructed substantially similar to the body shown in Figs. 1 to 6, inclusive, is provided with a partition 8x to provide a crew carrying compartment 43 and a storage or operating compartment 44, the side and front walls of the compartment 43 being suitably connected to the cowl 41'. The partition is formed with an opening 9x' arranged to be closed by a sliding door 10x guided in the manner already set forth in connection with the door shown in Figs. 2, 3 and 4. 45 indicates the front seats, 46 indicates the rear seats, forming an aisle between them in alinement with the opening 9x' and 47 indicates the auxiliary seats. 48, 49, indicate doors on the right side of the compartment 43 related to the floor spaces in front of the seats 45, 46, respectively, the steps adjacent the doors consisting of a running board 50. 51 indicates a door on the left side of the compartment 43 to permit access to the adjacent front seat 45. In this form of construction the crew carrying compartment 43 has a width equal to that of the compartment 44, so that I provide a chamber 52 for the derrick poles 15, extending through the compartment 44 and into the compartment 43, the chamber 52 being similarly constructed and arranged as shown and described with respect to Figs. 1 to 5, inclusive.

Figure 12:
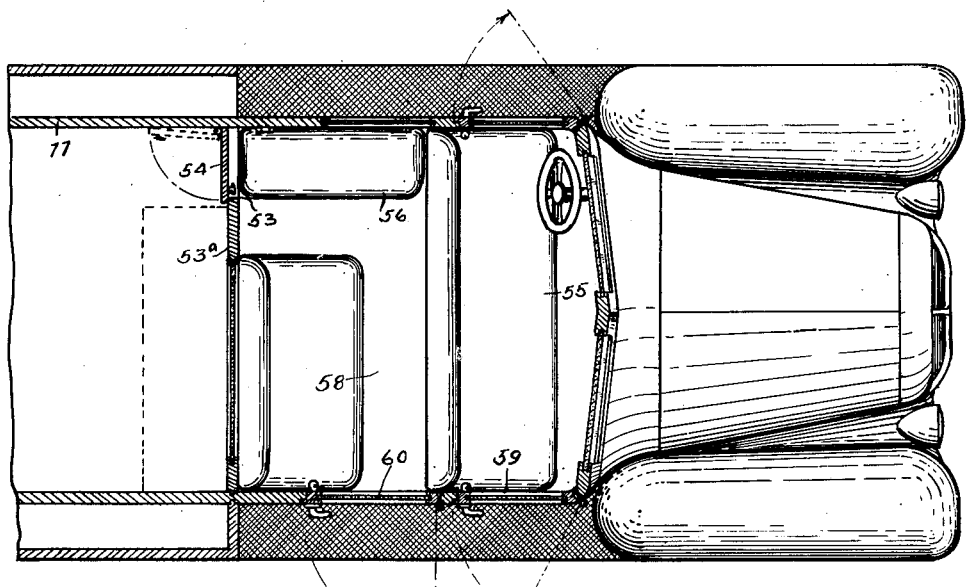
Figs. 12 and 13 are fragmentary sections, also on the line 11—11 of Fig. 10, the former showing door and seat arrangements substantially similar to Fig. 8 and the latter showing door and seat arrangements substantially similar to Fig. 9.

Fig. 12 shows a modified form of construction wherein the body is mounted similarly to that shown in Figs. 10 and 11, but the crew carrying compartment is of less width than the storage or operating compartment. In this form of construction the opening 53 in the partition 53a is provided adjacent the side member 11 at the left side of the body and the door 54 for the opening is hinged to the side member to swing inwardly. 55 indicates a front seat extending entirely across the crew carrying compartment. 56 indicates a longitudinally extending seat hinged to the left side wall of the crew carrying compartment between the opening 53 and seat 55 and adapted to be swung upwardly to permit passage through the opening from one compartment to the other. 57 indicates a transversely arranged rear seat extending from the right side wall of the crew carrying compartment, the outer end of the seat being spaced from the seat 56 and forming an aisle 58 between them and the front seat 55 and leading to the opening 53. 59, 60, indicate doors in the right side of the crew carrying compartment leading to the floor space forward of the seat 55 and aisle 58, respectively. 61 indicates a door on the left side of the crew carrying compartment adjacent the front seat 55.

Figure 13:
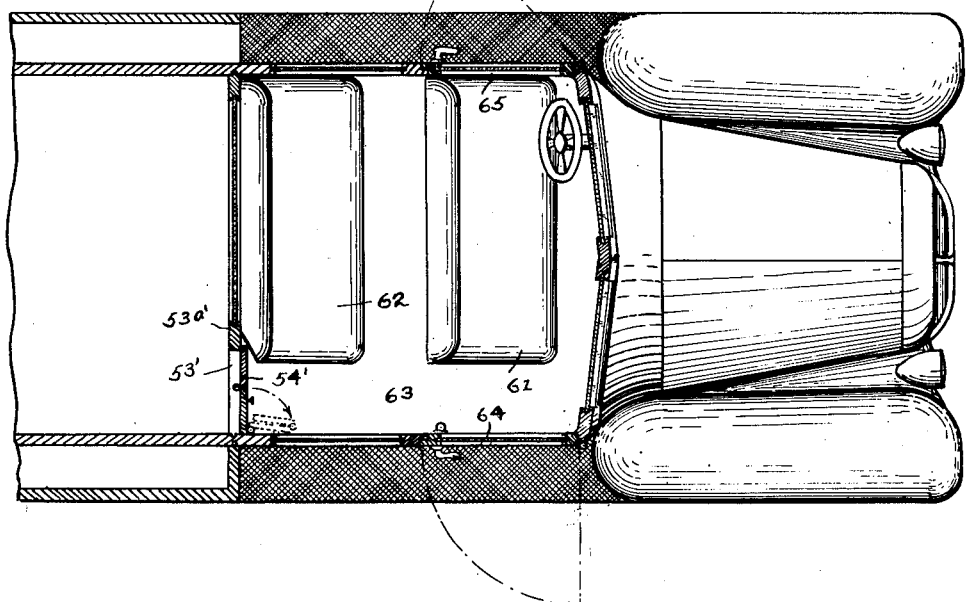

Fig. 13 shows another modified form of construction wherein the body is mounted similarly to that shown in Figs. 10 and 11, the crew carrying compartment being of a width less than that of the storage or operating compartment. In this form of construction the opening 53' in the partition 53a' is provided adjacent the side member 11 at the right side of the body and the door 54' for the opening is preferably of the hinged-together panel type, as already described in connection with Fig. 9, and adapted to swing into the crew carrying compartment. As shown, both front and rear seats 62, 62a, are arranged adjacent the left side of the compartment, their outer ends terminating in spaced relation to the right side of the compartment to form an aisle 63 alined with the opening 53' and extending longitudinally of the compartment. 64 indicates a single door in the wall at the right side of the compartment to provide for ingress to the aisle 63 and both seats. 65 indicates a door at the left side of the compartment adjacent the front seat.

From the foregoing description it will be noted that I provide a body having a crew carrying compartment and an operating or storage compartment, the former compartment having improved seating and door arrangements whereby a full complement of crew may be seated and protected from weather conditions, and access to the seats through the doors as well as passage from one compartment to the other is conveniently accomplished. Where the body extends over the engine as shown in Figs. 1 to 6, the wheel base is shortened, whereby maneuvering of the truck into parking position and with relation to the work or location of an assigned operation, is facilitated.

It will also be noted that in certain forms of construction wherein the width of the crew carrying compartment is equal in width to the other compartment, I provide an elongated chamber, which extends into the crew carrying compartment, for the derrick poles. These poles are not only conveniently located, but arranged on that side of the body according to adopted practice.

It will also be noted that the doors and seats may be arranged to accommodate any desired position of the winch. Where the winch is to be mounted on the floor 5, the door and passage or opening between the compartments is arranged at or adjacent the left side of the body (see Figs. 7, 8 and 12). Where the winch is otherwise mounted, for example, below the rear seat, the door and passage or opening between the compartments may be arranged at the right side of the body (see Figs. 9 and 13).

The doors 24, 24a shown in Figs. 1, 4 and 5 are hinged along their rear edges which relates their free edges to the steps 24x to facilitate ingress or egress since the steps 24x are disposed in front of the front wheel fenders. The door 25 is preferably hinged along its forward edge. This door hinging arrangement is preferably followed in the forms of construction shown in Figs. 7, 8. In Fig. 9 the doors 39 and 40 are hinged along their edges remote from the steps 24x for the same reason. In Figs. 10 and 11, the doors 48, 48a, adjacent the front seats 45, 45, are preferably hinged along their forward edges.

Each of the doors between the compartments shown in Figs. 7, 8, 9, 12 and 13 may be mounted to swing in either direction and hinged along either side of the adjacent opening; each may be formed of a single panel or hinged-together panels as desired.

To those skilled in the art to which my invention relates many changes in construction and widely differing embodiments and applications of the invention will suggest themselves without departing from the spirit and scope thereof. My disclosures and the description herein are purely illustrative and not intended to be in any sense limiting.

What I claim is:

1. In a wheel mounted vehicle construction, a body open at its rear end and having a flooring and side and front walls and a roof, a transverse partitition forming within the body a front crew carrying compartment and a rearward operating or storage compartment, seats in the said first mentioned compartment, side members along the opposite sides of said last mentioned compartment, and a chamber adapted to receive derrick poles and other elongated devices, extending through one of said side members and into said crew carrying compartment.

2. A vehicle construction as claimed in claim 1 wherein that portion of said chamber within the crew carrying compartment is arranged below the seats therein.

3. In a vehicle construction, a wheel mounted chassis supporting an engine at its forward end, a body on said chassis and extending at its forward end over the engine thereon, said body comprising a flooring and side and front walls open at the rear end and a roof, a transverse partition forming within the body at its front end a crew carrying compartment and a rearward operating or storing compartment and formed with an opening, front and rear seats in said first mentioned compartment in spaced relation to form an aisle between them, said operating or storage compartment being provided with a side member, and an elongated chamber adapted to receive derrick poles and other elongated devices, provided in and extending through said side member and into the crew carrying compartment.

4. In a vehicle construction, a wheel mounted chassis supporting an engine at its forward end, a body on said chassis and extending at its forward end over the engine thereon, said body being open at its rear end and comprising a flooring and side and front walls and a roof, a transverse partition forming within the body a front crew carrying compartment and a rearward operating or storage compartment, transversely arranged front and rear seats in said crew carrying compartment arranged adjacent one side wall thereof and spaced from its opposite side wall to form an aisle adjacent the latter side wall and extending longitudinally of said crew carrying compartment, said partition being formed with an opening alined with said aisle, a door for said opening, and a door in the last mentioned side wall of said crew carrying compartment leading to said aisle and the flooring forward of said seats.

5. In a wheel mounted vehicle construction, a body open at its rear and comprising a flooring and side and front walls and a roof, a transverse partion forming within the body a front crew carrying compartment and a rearward operating or storage compartment, transversely arranged front and rear seats in said crew carrying compartment arranged adjacent one side wall thereof and spaced from its opposite side wall to form adjacent the latter side wall an aisle extending longitudinally of said compartment and leading to the flooring forward of said seats, said partition being formed with an opening alined with said aisle, a door for said opening, and a door in the last mentioned side wall of said crew carrying compartment leading to said aisle.

6. In a wheel mounted vehicle construction, a body open at its rear end and comprising a flooring and side and front walls and a roof, a transverse partition forming within the body a front compartment for the driver and operatives and a rearward operating or storing compartment, said partition extending from the side wall adjacent the driver's position toward the opposite side wall and spaced from the latter to form a passage from one compartment to the other, spaced front and rear transversely arranged seats in the said first mentioned compartment extending from the side wall thereof adjacent the driver's position toward its opposite side wall and spaced from the latter side wall to form a longitudinally extending aisle alined with said passage and merging with the floor spaces forward of said seats, said opposite side wall being provided with a door leading to said aisle, and a door for said passage.

7. In a vehicle construction, a body open at its rear end comprising a flooring and side and front walls and a roof, a transverse partition forming within the body at its front end a crew carrying compartment and a rearward operating or storing compartment and formed with an opening, a front seat in the said first mentioned compartment, rear seats in said first mentioned compartment in spaced relation to form an aisle between them alined with said opening, said operating or storage compartment being provided with a side member, and an elongated chamber adapted to receive derrick poles and other elongated devices, provided in and extending through said side member and into the crew carrying compartment.

8. In a vehicle construction, a body open at its rear end and comprising a flooring and side and front walls and a roof, a transverse partition forming within the body a front crew carrying compartment and a rearward operating or storage compartment, transversely arranged front and rear seats in said crew carrying compartment arranged adjacent one side wall thereof and spaced from its opposite side wall to form an aisle adjacent the latter side wall and extending longitudinally of said crew carrying compartment, said partition being formed with an opening alined with said aisle, a door for said opening, and a door in the last mentioned side wall of said crew carrying compartment leading to said aisle and the flooring forward of said seats.

EDWARD J. STAHL.